United States Patent [19]
Rogers et al.

[11] Patent Number: 5,765,776
[45] Date of Patent: Jun. 16, 1998

[54] OMNIDIRECTIONAL AND CONTROLLABLE WING USING FLUID EJECTION

[75] Inventors: Ernest O. Rogers, Great Falls, Va.; Robin D. Imber, Rockville, Md.

[73] Assignee: The United States of America as represented by the Secretary of the Navy, Washington, D.C.

[21] Appl. No.: 734,824

[22] Filed: Oct. 22, 1996

[51] Int. Cl.⁶ ............................................. B64C 39/06
[52] U.S. Cl. .................. 244/12.2; 244/23 C; 244/17.11; 244/207; 244/736
[58] Field of Search .......................... 244/12.1, 12.2, 244/12.3, 23 R, 23 C, 73 B, 73 C, 73 R, 207, 36

[56] References Cited

U.S. PATENT DOCUMENTS

| | | | |
|---|---|---|---|
| 2,108,652 | 2/1938 | Coanda | 244/73 B |
| 3,016,213 | 1/1962 | Griswold, II | 244/207 |
| 3,062,483 | 11/1962 | Davidson | 244/207 |
| 3,073,551 | 1/1963 | Bowersox | 244/73 B |
| 3,224,711 | 12/1965 | Warren et al. | 244/23 C |
| 3,451,645 | 6/1969 | Wolcott | 244/207 |
| 5,054,713 | 10/1991 | Langley et al. | 244/12.2 |
| 5,203,521 | 4/1993 | Day | 244/12.2 |

FOREIGN PATENT DOCUMENTS

| | | | |
|---|---|---|---|
| 1281518 | 12/1961 | France | 244/12.2 |

*Primary Examiner*—Galen L. Barefoot
*Attorney, Agent, or Firm*—John Forrest; Jacob Shuster

[57] ABSTRACT

A vehicular lift wing having a Coanda edge perimeter, is provided with a nozzle slot formation from which fluid ejection is directed tangentially from the full Coanda edge perimeter during translation through an ambient fluid medium. Omnidirectional control means supplies pressurized fluid to the nozzle slot formation at different azimuthal locations along the Coanda edge perimeter for selectively controlled generation of dynamic forces exerted on the wing.

3 Claims, 3 Drawing Sheets

OMNIDIRECTIONAL AND CONTROLLABLE WING USING FLUID EJECTION

The present invention relates in general to lifting wings and appendages with which lift, thrust and directional controls are associated.

BACKGROUND OF THE INVENTION

The provision of a fixed or rotary wing for aircraft or hydrofoil vessels associated with generation of dynamic forces thereon by perpendicular ejection jets during translation of such wing through some ambient fluid medium, is generally well known in the art as disclosed for example in U.S. Pat. No. 3,936,013 to Yuan. According to the Yuan patent, the jet flow emanates from the trailing edge of an elongated wing to break up wing tip vortices. A fixed circular wing on the other hand is described in U.S. Pat. No. 3,936,013 to Bose, wherein the wing is positioned inside of an aircraft fuselage within which the air flow over the wing surfaces is directed internally within the fuselage.

The tangential ejection of fluid outflow over Coanda edge portions of an airfoil or hydrofoil is also generally known in the art, including formation of passages internally within the associated airfoil or hydrofoil from which such outflow occurs. U.S. Pat. Nos. 4,131,390, 4,137,008 and 5,464,321 disclose for example such tangential fluid ejection arrangements for propeller blades. Also, U.S. Pat. No. 4,976,349 to Adkins discloses formation of a duct within the airfoil, receiving the tangential ejection flow. According to U.S. Pat. No. 5,158,251 to Taylor, tangential ejection outflow is located at the lateral end of an elongated aircraft wing. Thus, according to such prior art arrangements tangential ejection outflow is directionally restricted by the portions of the airfoil or hydrofoil from which it emanates.

It is therefore an important object of the present invention to utilize tangential ejection outflow from a Coanda edge of a lift wing independently of its translation direction through an ambient fluid so as to enhance lift and enable development of directionally controlled dynamic forces without complex geometrial modification of the surfaces exposed to the ambient fluid.

SUMMARY OF THE INVENTION

In accordance with the present invention, a planform type of wing is provided with a Coanda edge along a continuous perimeter from which fluid outflow tangential to the Coanda edge is selectively effected by omnidirectional supply of pressurized fluid to different azimuthal locations along the full perimeter in order to develop lift and thrust and generate lift without pitch while the wing is being translated through the ambient fluid medium at different speeds in a horizontal direction, and even while being rotated about its axis.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
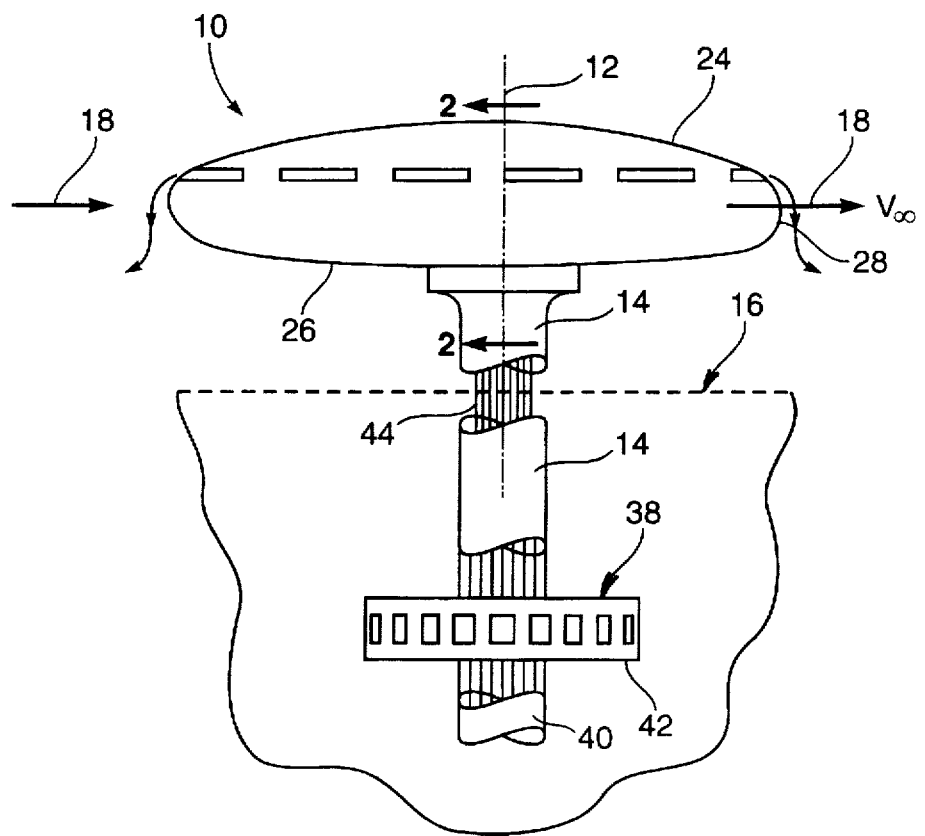
FIG. 1 is a partial side elevation view, with a portion shown in section, of a circular planform wing and associated environment in accordance with one embodiment of the invention.

Referring now to the drawing in detail, FIG. 1 illustrates a low aspect ratio type of planform wing 10 with a continuous perimeter, which is circular in a plane perpendicular to a central axis 12 of a tubular support 14 in a vertical direction of lift. The wing 10 is thereby fixedly mounted or rotatable about axis 12 on a vehicle 16 such as an aircraft (as denoted by dotted line in FIG. 1) moving horizontally through an ambient fluid medium such as air so as to produce a horizontal freestream flow 18 of such ambient fluid relative to the wing 10 at varying speeds.

Figure 2:
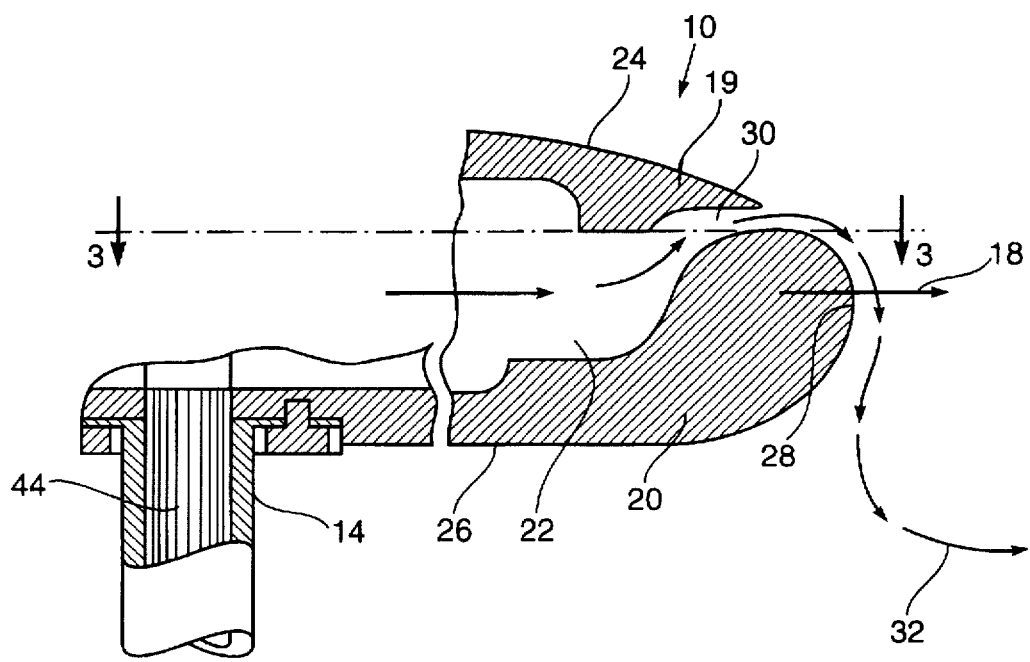
FIG. 2 is an enlarged partial section view taken substantially through a plane indicated by section line 2—2 in FIG. 1.

According to the embodiment as shown in FIG. 2, the wing 10 is made of a rigid material such as aluminum and has a cross-section formed by rotation about axis 12 of a two-dimensional circulation control airfoil contour having an upper section 19 and a lower section 20 between which an internal plenum 22 is established. The upper and lower wing sections 19 and 20 respectively expose to the ambient fluid medium continuous airfoil surfaces 24 and 26. The tubular support 14 extends from the lower surface 26 into the vehicle 16. The surfaces 24 and 26 terminate at a circular perimeter of the wing 10 formed by a cross-sectionally curved Coanda edge 28.

Figure 3:
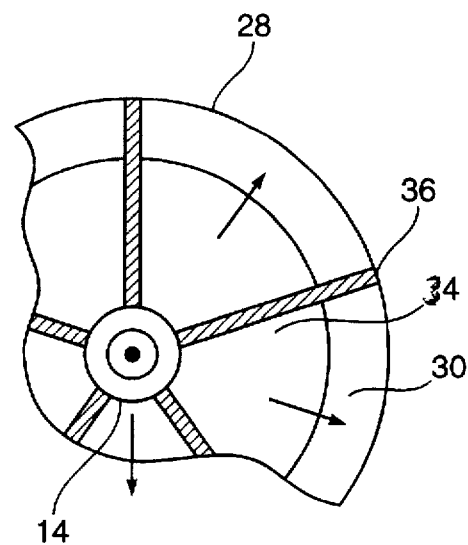
FIG. 3 is a partial section view taken substantially through a plane indicated by section line 3—3 in FIG. 2.
Figure 4A:
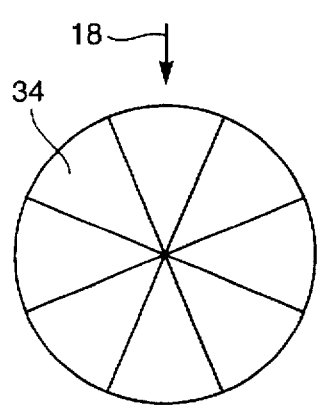
FIGS. 4A–4D are internal top view diagrams depicting different azimuthal configurations of fluid ejection outflow from the wing shown in FIGS. 1–3, in accordance with omnidirectional control pursuant to the present invention.
Figure 4B:
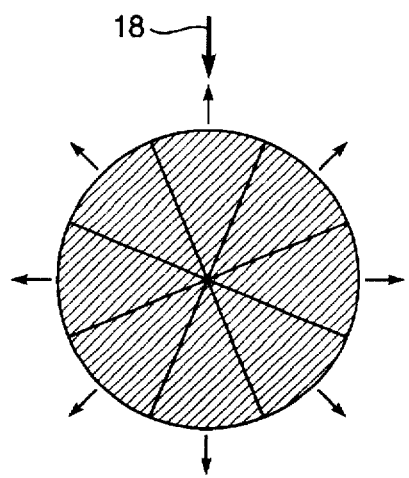

With continued reference to FIG. 2, pressurized fluid within the plenum 22 is ejected from between the upper section 19 and lower section 20 of wing 10 through a convergent, curved nozzle slot 30 bordering the Coanda surface of the circular edge 28. A tangential fluid ejection outflow at a regulated jet velocity, as indicated by arrows 32, is thereby achieved. In accordance with one embodiment, such fluid ejection outflow occurs from selective angular portions of the circular perimeter of the wing 10 at different azimuthal locations for interaction with the freestream flow 18 aforementioned. In such case, the plenum 22 and nozzle slot 30 are divided along the full circular perimeter of edge 28 into a plurality of angular segments 34 as shown in FIG. 3 separated by partition channel wall 36 extending radially from the tubular support 14. Pressurized fluid is supplied to selected angular segments 34 of the plenum 22 from a suitable source according to the embodiment shown in FIG. 1 through a valve regulated flow control device 38. The flow control device 38 includes for example a supply conduit 40 extending from a pressurized fluid source to a rotatable valve 42 through which the pressurized fluid is respectively directed to the angular segments 34 through a plurality of tubes 44 within the tubular support 14. Selective displacement of the valve 42 by a suitable operating mechanism associated therewith correspondingly selects the azimuthal locations along the perimeter of edge 28 from which tangential fluid ejection occurs. Alternatively, the pressurized fluid source is directly connected to the tubular support 14 for supply of pressurized fluid to remotely operated valves within each angular segment 34. Thus, angular control over the tangential fluid ejection outflow varying between zero ejection as diagrammatically represented in FIG. 4A and full ejection from the entire circular perimeter of the planform wing 10 as represented in FIG. 4B is provided in order to obtain high lift omnidirectional operation, generate moments, develop lift and thrust and generate lift with and without pitching moment changes during horizontal translation of the wing 10 as depicted in FIG. 1 producing the freestream flow 18.

Figure 4C:
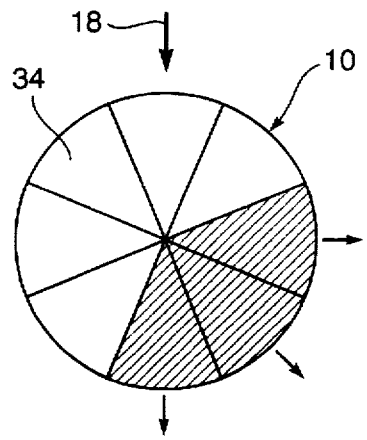
Figure 4D:
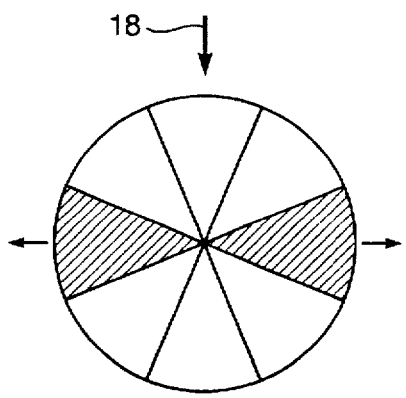

In operation, the pressurized fluid ejected from the perimeter slot 30 influences the global circulatory flow to develop lifting forces on the wing 10. The angular extent of the fluid ejection from slot 30 is selectively varied as aforementioned to produce moments, represented by way of example by the azimuthal configuration of FIG. 4C wherein the shaded angular portions of the wing represents the angular extent to which fluid ejection is limited relative to the direction of the freestream flow 18 by selective control for moment generation. Thus, lift force, pitching moment and rolling moment control has been achieved by selection of different azimuthal configurations. If the velocity of freestream flow 18 is zero, static lift and in-plane thrusting force can be generated for maneuvering in any direction. If an increase in lift is needed without a change in pitching moment, fluid is ejected from only lateral locations relative to the direction of freestream flow as represented by the azimuthal configuration of FIG. 4D. Such omnidirectional control capability associated with the arrangement of the present invention is achieved without complex variable geometry features on the lifting surfaces of wing 10.

The wing 10 and all of its structural components and operational features as hereinbefore described in connection with a separate aircraft vehicle 16, may also be associated with marine vessels having hydrofoil components including underwater vessels operating as a weapons platform. In the latter case, the hydrofoil components may for example be end plates with which all of the wing components and operational features of the present invention are associated. Also, such a wing itself may form part of a self-contained vehicle as an additional embodiment. Further, in the case of certain aircraft type vehicles, the wing may constitute a radome with respect to which forces thereon are controlled in accordance with the present invention.

According to yet another embodiment of the invention, a semi-circular planform wing component as a side appendage to a vehicle is utilized to radially eject fluid between zero and 180°, while otherwise embodying all of the features hereinbefore described for the circular planform wing 10.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a planform wing having upper and lower surfaces exposed to a fluid medium and a Coanda perimeter along which tangential ejection of pressurized fluid into the fluid medium is directed downwardly from the upper surface during rotation of the wing about an axis from which the Coanda perimeter is radially spaced by the upper and lower surfaces; control means for regulating generation of dynamic forces in the wing in response to said tangential ejection of the pressurized fluid into the fluid medium, including: nozzle means formed in the upper surface of the wing adjacent to the Coanda perimeter for effecting said tangential ejection from azimuthal locations along the Coanda perimeter; and selectively controlled valve means supplying the pressurized fluid to the nozzle means for restricting the tangential ejection to different combinations of said azimuthal locations.

2. The combination as defined in claim 1, including a support tube operatively connected to the wing and extending along said axis thereof from the lower surface thereof.

3. The combination as defined in claim 2, including plenum means within the wing between the upper and lower surfaces for conducting said pressurized fluid to the nozzle means; and partitioning walls within the plenum means extending radially from said axis of the wing to establish angular portions of the nozzle means at the different azimuthal locations to which said ejection of the fluid is selectively restricted.

\* \* \* \* \*